No. 651,875. Patented June 19, 1900.
A. MARTINI.
IGNITING DEVICE FOR GASES.
(Application filed Dec. 3, 1898.)
(No Model.)
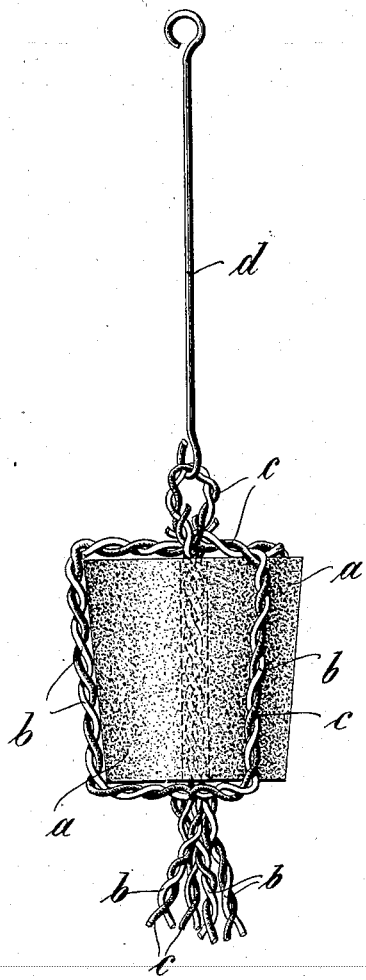
Witnesses:
Inventor:
Adolf Martini
by
Attorneys
THE NORRIS PETERS CO., PHOTO-LITHO., WASHINGTON, D. C.

UNITED STATES PATENT OFFICE.

ADOLF MARTINI, OF BERLIN, GERMANY, ASSIGNOR TO ANDREW WATSON LUDLOW, OF ST. LOUIS, MISSOURI, AND CHESTER B. WEEKS, OF PARIS, FRANCE.

IGNITING DEVICE FOR GASES.

SPECIFICATION forming part of Letters Patent No. 651,875, dated June 19, 1900.

Application filed December 3, 1898. Serial No. 698,205. (No specimens.)

*To all whom it may concern:*

Be it known that I, ADOLF MARTINI, a citizen of the United States of Amreica, and a resident of Berlin, in the Kingdom of Prussia, German Empire, have invented certain new and useful Improvements in Igniting Apparatus for Gases, (for which I filed applications for patents in Germany October 10, 1898; in Great Britain October 31, 1898, No. 22,901; in Belgium November 3, 1898, No. 108, 631, and in France November 3, 1898, No. 270,545,) of which the following is a specification.

All ignition-pills prepared by reducing their components by heat or in a current of illuminating-gas or hydrogen become in a very short time more or less useless, as by the reducing process part of their ingredients are transformed into hygroscopic and fritting materials.

The object of my present invention is a process for forming pills, of which an example is shown in the annexed drawing, containing neither hygroscopical nor any material able to frit.

To that purpose I proceed as follows: The raw pill is formed by impregnating any porous non-combustible material—meerschaum, for example—with salts of metals of the platinum group. Then this pill is exposed to a current of vapors of organic acids, preferably tartaric or formic acid, or instead of the latter ones also derivates of alcohol—as, for example, aldehydes, hydrazines, &c. The pills treated in the way described above will contain carbonized matter and are porous to a very high degree. These pills are treated for a second time with the solution of salts of the platinum group hereinbefore mentioned and exposed for a second time to the current of the mixture of the gases and vapors hereinbefore mentioned. Then they are for a moment brought to a red heat and afterward cleansed with water and diluted organic acids. A current of illuminating-gas cannot be ignited by such pills alone. Their heat must be transferred to a wire able to withstand white heat. The quick ignition of the gas is attained by employing two or more wires of different metals. Their melting-points must be widely apart. One of them must withstand white heat, whereas the other one must have a much lower melting-point. The diameter of this latter must be so chosen that if brought into a Bunsen flame it will readily melt; but in combination with the platinum wire no melting takes place, as the heat is immediately transferred to the latter. The explanation of it is as follows: The ignition-pill, which on account of its composition is heated to a red heat only, transfers the greater part of its heat on the surrounding gases and only a small fraction to the wires of platinum and palladium; but this fraction, in combination with the films of gases condensed on the surface of the wires, is sufficient to cause a rapid elevation of temperature in the wires. The melting-point of the palladium being about 300° inferior to that of the platinum, it would soon reach its melting-point if it were only surrounded by gases, as in case it cannot transfer with sufficient rapidity its heat by radiation on the latter. Platinum wires are provided which touch the former ones in one or several points, thereby giving the palladium wires an opportunity to transfer their heat with great rapidity to them by contact. The platinum has a strongly-marked diffusibility for gases, which increases with the heat. The consequence is that the platinum wires are brought to a very high degree of temperature by means of the heat transmitted from the palladium wires, which at last suffices to ignite the jet of gas. These wires are slightly tied together, passed through the pill or around it, and secured thereto in any desired way. The end of the wire must in any case protrude over the pill.

I preferably employ wires of platinum and palladium, the latter transmitting its heat to the former one.

In the accompanying drawing, *a* is the porous pill, containing platinum salts in state of very fine division. Thin wires *b* and *c* are slung around and passed through the same and tied together, so that their ends form a sort of brush on the under side of the pill. Two different metals are employed for said wires, the ones *b* being of platinum and the other ones, *c*, of palladium. By means of a piece of wire *d* the thus-prepared pill is suspended from an appropriate holder.

The heat of the glowing pill is transferred to the wires with which it is suspended, and these begin to glow in bright red heat. The jet of gas impinging on said glowing wires is immediately ignited with a feeble explosion.

Having now particularly described my invention, what I claim is—

A process for manufacturing ignition-pills for gas, consisting in the treatment of pills, formed by incorporating salts of the platinum group in any non-combustible, porous material, in vapors of organic acids, derivates of alcohol, then reimpregnating the pills thus obtained and containing carbonized matter with a solution of salts of the platinum group and repeating the reduction in the same way as hereinbefore described, and completing the treatment by cleansing the pills; substantially as and for the purpose described.

In testimony whereof I affix my signature in presence of two witnesses.

ADOLF MARTINI.

Witnesses:
HENRY HASPER,
E. L. GOLDSCHMIDT.